May 21, 1968 M. E. SIKORSKI 3,383,907
TUNNEL DIODE STRESS SENSING DEVICES
Original Filed Oct. 4, 1962 5 Sheets-Sheet 1

INVENTOR
M. E. SIKORSKI
BY
H. O. Wright
ATTORNEY

INVENTOR
M. E. SIKORSKI
BY
H. O. Wright
ATTORNEY

May 21, 1968   M. E. SIKORSKI   3,383,907
TUNNEL DIODE STRESS SENSING DEVICES
Original Filed Oct. 4, 1962   5 Sheets-Sheet 3

INVENTOR
M. E. SIKORSKI
BY
H. O. Wright
ATTORNEY

May 21, 1968  M. E. SIKORSKI  3,383,907
TUNNEL DIODE STRESS SENSING DEVICES
Original Filed Oct. 4, 1962  5 Sheets-Sheet 5

INVENTOR
M.E. SIKORSKI
BY
H. O. Wright
ATTORNEY 3,383,907
TUNNEL DIODE STRESS SENSING DEVICES
Mathew E. Sikorski, New Providence, N.J., assignor to Bell Telephone Laboratories, Incorporated, New York, N.Y., a corporation of New York
Original application Oct. 4, 1962, Ser. No. 228,354. Divided and this application Nov. 16, 1966, Ser. No. 608,243
4 Claims. (Cl. 73—88.5)

ABSTRACT OF THE DISCLOSURE

Back-biased tunnel diodes with uniaxial stress applied normally to the junction are employed as acousto-electric transducers, strain gauges and other devices. Optimal junction shapes described include circular, spot and line.

---

This is a division of application Ser. No. 228,354, filed Oct. 4, 1962.

This invention relates to stress sensing devices. More particularly, it relates to such devices which employ the tunnel diode.

My application Ser. No. 228,355, filed Oct. 4, 1962, now Patent 3,182,492 which issued May 11, 1965 is directed to related subject matter and insofar as it is relevant is incorporated by reference as an integral portion of the disclosure of the present application.

The tunnel diode, frequently referred to as the Esaki diode since it was invented by Leo Esaki several years ago, is now becoming well known to those skilled in the art and the techniques relating to its use are being continuously modified and expanded. It has, for example, been the subject of numerous publications since the publication by Esaki of an article in the Physical Review, volume 109, 1958, page 603. Much additional work has been done by others, as described for example in articles by G. C. Dacey entitled "Esaki Diodes" published in the Bell Laboratories Record for April 1961, starting at page 122, and by F. Sterzer and A. Presser entitled "Stable Low-Noise Tunnel-Diode Frequency Converters" published in the RCA Review, volume 23, No. 1, March 1962, pages 3 through 28, inclusive.

The highly distinctive feature of the tunnel diode, as is now well known to those skilled in the art, is that its forward current-voltage characteristic includes a pronounced "negative resistance" region, that is, the current increases with voltage initially (that is, from zero voltage) but suddenly begins to decrease with voltage until a "second" value of voltage is reached beyond which a further voltage increase is again accompanied by an increase in current. The peculiar behavior in this initial portion of its current-voltage characteristic (that is, between zero voltage and approximately the "second" value of voltage) is ascribed to "quantum mechanical tunneling" and the portion is consequently often referred to as the tunneling portion of its characteristic. Between the point at which maximum current is reached in this initial portion of the characteristic and approximately the "second" voltage value, that is, throughout the region in which the device appears to have a negative resistance, its characteristic may be highly unstable and may suddenly jump (or switch) from one side to the other of this region.

Tunnel diode applications heretofore proposed have been principally directed toward utilization of the negative resistance property for amplifying, oscillating and high speed switching circuit arrangements. A number of other possible uses of the tunneling effect are mentioned in the above article by Dacey.

The tunnel diode consists of a very thin p-n junction between a portion of degenerate n-type semiconductor ("degenerate" signifying, for the purposes of the present application, that the portion is heavily "doped" with specific impurities) and a portion of degenerate p-type semiconductor (heavily "doped" with different specific impurities). It is frequently made by selecting a wafer of one type of "degenerate" semiconductor (p or n) and inducing a small amount of the opposite type of degenerate semiconductive material (n or p, respectively) in a very thin layer of the wafer over a limited area of the wafer, thus forming a small and very thin p-n junction.

This may be accomplished, for example, by alloying the end of a metallic lead or a small metallic sphere, containing, in some instances, an appropriate impurity, to the degenerate wafer.

The result is, as just mentioned, the formation of a small and extremely thin junction layer through which the phenomenon of "quantum mechanical tunneling" can take place. Such junctions are usually of at least approximately circular shape and may, for example, have a diameter of from three tenths of a mil inch to two mil inches. Too large an area is objectionable since it could pass a sufficiently large current to destroy the junction.

In view of the minute dimensions of the junction, tunnel diodes may have likewise minute over-all dimensions. For example, a tunnel diode may be formed on a small piece of "semiconductive tape" of the type disclosed in Patent 3,172,858, issued on Mar. 9, 1965 to E. S. Greiner and J. A. Gutowski, and assigned to applicant's assignee. It is further noted that by employing a structure of the type disclosed and claimed in Patent 3,116,443 issued to J. H. Forster and J. F. Grandner, granted Dec. 31, 1963, and assigned to applicant's assignee, that a very small tunnel diode microphone suitable for insertion through a vein for medical tests of the heart and the like is readily fabricated.

The metallic lead or sphere in instances such as are mentioned above also affords an electrical connection to the "outer" side of the junction. Connection to the "inner" side of the junction must, obviously, be effected through the body of the wafer. As the highly (or heavily) "doped" or degenerate wafer has a relatively low resistivity, electrical connection to the inner side of the junction is readily effected by electrodes making ohmic contact with the body of the wafer. A specific tunnel diode of this type is usually designated as being of p or n-type in accordance with the type (p or n) of the semiconductive material of which the wafer is made. Such conventional designations will be employed throughout the present application.

In some instances the properties of the junction can be significantly different for junctions formed on a p-type degenerate wafer from those formed on an n-type degenerate wafer, the wafer being in both cases of the same basic semiconductive material.

In an alternative form, a wafer of pure (that is, non-degenerate) semiconductive material may have a relatively thin degenerate or highly "doped" layer induced upon a surface thereof as, for example, by any of several well known diffusing techniques and a tunnel junction may then be made, as described above, to the highly doped region. Since the pure semiconductive materials are in general of high resistivity, electrical ohmic contacts to the "inner" side of the junction must in such cases usually be made to the highly doped region, that is, the relatively thin, highly doped, low resistivity layer induced on the surface of the wafer.

Further remarks regarding the making of tunnel diodes are given hereinunder.

It will be demonstrated in the present application that tunnel diodes can be very effectively employed in stress sensing devices such as strain gauges, microphones, electromechanical transducers and the like. They are, as stated above, in general very small and are therefore ideal for use as strain gauges to determine the strains at nearly dimensionless (extremely small) points on a member in which the strain distribution is to be determined. Specific tunnel diodes will be shown to have unusually high sensitivity to stress.

The negative resistance region of a tunnel diode may be stabilized and "constant current" or "constant voltage" operation can be effected in this region, as taught, by way of example, in my Patent 3,184,972 granted May 25, 1965. Patent 3,065,636 issued to W. G. Pfann, on Nov. 27, 1962 is also of interest in connection with the present application. The two just mentioned copending applications are assigned to applicant's assignee.

Insofar as applicant is aware, tunnel diodes when employed for sensing stress have heretofore uniformly been employed in circuits which supply a forward or "positive" bias across the diode (the electrical connection to the "outside" of the tunnel junction being positive with respect to the connection to the "inner" side of the junction through the body of the wafer), the bias usually being of a value such that the diode is operating closely adjacent to the "negative resistance" region of the initial or "tunneling portion" of its current-voltage characteristic. Operation in this manner, in the absence of adequate stabilizing arrangements, involves a risk of instability in that the diode may respond to circuit noise by switching from one side to the other of the negative resistance region of its forward or positive characteristic, as will be explained in further detail hereinunder.

To avoid the necessity of providing stabilizing arrangements and the risk of instability, while retaining comparable sensitivity, and in some instances realizing improved sensitivity, the present invention proposes the use of a moderate backward or "negative" bias (the "inner" side of the junction in the body of the wafer being rendered positive with respect to the connection to the "outside" of the tunnel junction) with one or more stress sensitive tunnel diodes, which results in an operating range sufficiently far removed from the negative resistance region of the characteristic of the diode that there is no risk of the diode, or diodes, switching from one side to the other of the negative resistance region of the forward characteristic.

Operation with a moderate backward or negative bias is possible in the case of the Esaki or tunnel diode since it is not a rectifying or unilaterally conducting device as contrasted with the prior art semiconductor diodes familiar to the art, which prior art diodes have a single, much thicker (conventional) p-n junction through which "quantum mechanical tunneling" cannot occur. Prior art semiconductor diodes therefore conduct substantially no current under a backward or negative bias until the latter has reached a relatively large value.

The invention further proposes a number of ways in which the effectiveness of tunnel diodes can be increased as stress sensing members. Additional innovations proposed in the present application and described in detail hereinunder include the use of a plurality of tunnel diodes connected electrically either in parallel or in series, and specific shapings and mountings which enhance the effectiveness of the diodes.

Accordingly, a principal object of the invention is to eliminate instability of tunnel diodes by simple means when employed as stress sensing members.

A further object is the improvement of the operating characteristics of stress indicating circuits employing tunnel diodes.

A still further object is to increase the utility of tunnel diodes for stress sensing purposes.

These and other objects, features and advantages of the invention will become apparent from a perusal of the following description of illustrative arrangements as exemplified in the accompanying drawing, in which:

Throughout the above described figures corresponding apparatus details are in general designated by like designation numbers.

Semiconductive materials commonly employed in making tunnel diodes include silicon, germanium, and a group of binary (or two-element) chemical compounds having one element from class III and the other from class V of the Periodic Atomic Table according to Mendeleeff. Among such binary compounds are aluminum phosphide, gallium arsenide, gallium antimonide, indium antimonide, indium arsenide, indium phosphide, and a number of others.

There is a substantial variation in the sensitivities to stress of tunnel diodes of various materials such as those mentioned above. As previously mentioned, the type of wafer, p or n, upon which the tunnel junction is formed may also significantly affect the sensitivity of the junction to stress. For example, a number of tunnel diodes of silicon, germanium, gallium arsenide and gallium antimonide were each subjected to a hydrostatic pressure of 20,000 pounds per square inch and the percentage change in the value of their respective peak currents as compared with their peak currents at atmospheric pressure were measured. It was found that in the case of silicon tunnel diodes on n-type wafers the peak current increased by 2.5 percent. In the case of germanium tunnel diodes on n-type wafers, the peak current decreased by 15.5 percent. For gallium arsenide tunnel diodes of p-type wafers, the peak current decreased by 20 percent. For gallium antimonide tunnel diodes on p-type wafers, the peak current decreased by 39.5 percent.

From the above recited results it would appear that gallium antimonide tunnel diodes on p-type wafers are substantially twenty times as sensitive to hydrostatic pressure as silicon tunnel diodes. A further test indicated that gallium antimonide tunnel diodes on n-type wafers were substantially fifty times as sensitive to stress as silicon tunnel diodes. In general, specific tunnel diodes are approximately equally sensitive to hydrostatic and linear stresses. It is furthermore usually immaterial whether the linear stresses are normal to or are laterally directed with respect to the tunnel junction. It should, of course, be borne in mind that, as explained at length hereinbelow, tension perpendicular to the junction is equivalent to compression laterally or transversely applied and compression perpendicular to the junction is equivalent to tension laterally or transversely applied.

As is known to those skilled in the art, tunnel diodes can be made in any of a considerable number of ways. A few methods are indicated below by way of specific examples.

A silicon tunnel diode (n-type wafer) is, for example, readily made by doping the silicon with substantially $5 \times 10^{19}$ parts per cubic centimeter of antimony after which an aluminum wire with one percent of boron as an impurity is alloyed to the surface of the wafer by heating to a temperature of 725 degrees centigrade until alloying takes place after which the device should be rapidly cooled, lest a junction too thick to permit the phenomenon of "quantum mechanical tunneling" to take place should be formed.

For the above-mentioned reason, rapid cooling is essential in all methods of making tunnel diodes since prolonging the alloying process is apt to result in the formation of an ordinary prior art p-n junction through which no appreciable tunneling can take place.

A germanium tunnel diode (n-type wafer) can be made in substantially the manner indicated above for silicon except that a pure aluminum wire can be used, that is, no boron is needed as an impurity in the aluminum wire.

A variation of the method is to place the wire in contact with the wafer of semiconductive material and discharge a capacitor across the contact. The charge on the capacitor should, of course, be sufficient to effect an appropriate degree of alloying but insufficient to form a junction of such thickness that "tunneling" cannot take place.

A second method of making tunnel diodes is to evaporate a layer of an appropriate metal containing a suitable impurity on a surface of a wafer of appropriately doped semiconductive material and to heat until the alloying temperature is reached after which the device should be rapidly cooled.

In a third method a small sphere or ball or the end of a thin lead of an appropriate metal containing a suitable impurity is alloyed to the surface of a wafer of appropriately doped semiconductive material.

In a fourth method an element of a high resistivity semiconductive material, that is, one essentially free from impurities, the upper surface of which is highly doped by any conventional diffusing and masking techniques, has a tunnel junction induced in the highly doped region by means of any of the above indicated processes.

A fifth method comprises epitaxially depositing a highly doped material over a predetermined region of the surface of a semiconductive member and making a tunnel junction to the deposited region as above described. Reference may be had, for example, to Patent 2,692,839, granted Oct. 26, 1954 to H. Christensen and G. K. Teal and Patent 3,152,022 granted to H. Christensen and R. S. Wagner, on Oct. 6, 1964, and assigned to applicant's assignee, for information relating to epitaxial deposition of semiconductive materials.

Methods of making either p-type or n-type tunnel diodes of gallium antimonide are described in detail in applicant's above-mentioned concurrently filed copending application.

Specific illustrative arrangements of the invention are described in detail hereinunder.

Figure 1:
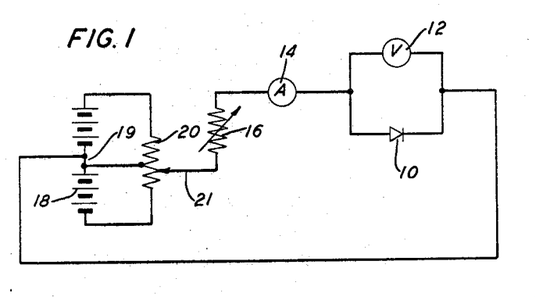
FIG. 1 is an electrical schematic diagram of a circuit which may be employed in practicing the invention.

In more detail in FIG. 1, a battery 18 shunted by a potentiometer 20 has its mid or median voltage point 19 connected to the right terminal of a tunnel diode 10, the "forward" direction of diode 10 being from left to right (that is, for an n-type wafer the triangle represents a connection to the "outer" side of the tunnel junction and the vertical short line represents an ohmic connection to the "degenerate" body portion of the wafer). It should be borne in mind that tunnel junctions are, as mentioned hereinabove, of extremely limited area and very small over-all dimensions notwithstanding that for obvious practical reasons they are shown in the figures of the accompanying drawing as having much larger dimensions than they will normally have. The movable contacting arm 21 of potentiometer 20 is connected through a variable impedance element 16 and an ammeter 14 to the left terminal of diode 10. A voltmeter 12 shunted across diode 10 completes the circuit. In the operation of a number of structures in accordance with the invention, as will presently become apparent, a specific fixed negative bias is employed. The circuit arrangement including battery 18 and potentiometer 20, 21 can, however, be employed to determine the current-voltage characteristics of the diode over a wide range of voltages including both "forward" (positive) and "backward" (negative) voltages to obtain characteristic curves such, for example, as those which will be discussed in more detail in connection with FIGS. 5, 9, 12 and 14.

Figure 2:
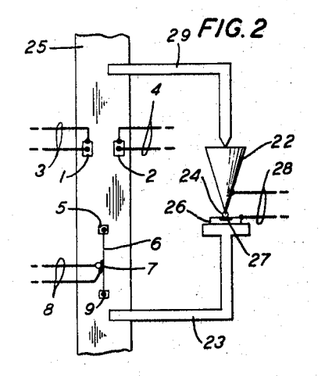
FIG. 2 illustrates one manner of applying a uniaxial stress perpendicularly to the junction of a tunnel diode.

In FIG. 2, one arrangement for applying a uniaxial (as opposed to hydrostatic or omnidirectional) stress perpendicularly to the junction of a tunnel diode is illustrated. A small wafer of semiconductive material 26 of either p or n-type conductivity is supported on a rigid supporting member 23. A tunnel diode is formed by inducing a very small and very thin layer 27 of opposite type conductivity on the surface of wafer 26. This may be done, by way of specific example, by selecting a wafer of silicon highly doped with antimony and fusing a small aluminum sphere 24 containing approximately one percent of boron to alloy with the surface of the wafer, following which the junction is rapidly cooled. A very small and very thin junction through which "quantum mechanical tunneling" can take place is thus formed between layer 27 and wafer 26. A conductive tapered member 22 makes mechanical and electrical connections with sphere 24, as indicated. A second rigid member 29 is joined, as by spot welding, to the center point of the upper surface of member 22. Members 23 and 29 are in turn firmly held at their left ends at appreciably separated joints on a member 25 so that when member 25 is subjected to strain a stress which may be either compression or tension (corresponding to the strain to which member 25 is subjected) will be impressed on the above-mentioned tunnel junction. Member 25 or an appropriate portion of either member 23 or 29 should be of electrically nonconductive material to avoid short circuiting the diode.

If the stress applied through member 22 varies in amplitude at an appreciable frequency, as, for example, where member 25 is part of an aircraft being subjected to substantial vibratory stresses, tapered member 22 can be readily adapted to function as a "mechanical transformer," as taught, for example, in Patent 2,573,168, granted Oct. 30, 1951 to W. P. Mason and R. F. Wick, to produce a substantial "step-up" of the force as applied to the tunnel junction.

Upper lead 28 may then be connected to member 22 and lower lead 28 should make an ohmic contact with the wafer 26. The latter can be effected, for example, by fusing a gold lead to the surface of wafer 26.

Leads 28 may be employed to connect the tunnel diode into a circuit such as that illustrated by FIG. 1, described in detail above, so that variations of voltage and current with applied stresses are readily observed.

Where more detailed information concerning the distribution of strain at specific points on member 25 is desired, small wafers including tunnel diode junctions may be firmly bonded as by a strongly adhesive cement directly on the specific points, as for example, tunnel diodes 1 and 2 will when connected through their leads 3 and 4, respectively to circuits of the type exemplified by FIG. 1 provide indications of the strain in member 25 at their respective positions. In similar manner, tunnel diode 7 formed on a short piece of semiconductor tape as suggested in the above mentioned copending application of Greiner and Gutowski with the ends of the tape 5 and 9 securely fastened to member 25 by strongly adhesive cement will when its leads 8 are connected to a circuit such as that of FIG. 1 provide indications of strain in member 25 between the points 5 and 9. In the arrangements of tunnel diodes 1, 2 and 7, the tunnel junction is obviously stressed in a direction transverse to the plane of the junction. The relation between transversely directed and perpendicularly directed stresses as applied to tunnel junctions will be discussed in further detail hereinunder.

Figure 3:
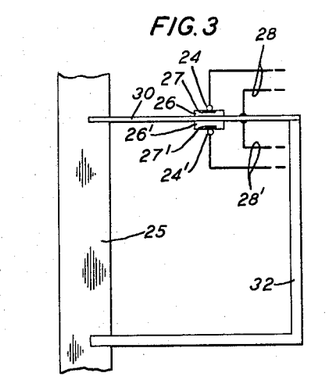
FIG. 3 illustrates a second manner of applying a uniaxial stress which is directed laterally to the junction of a tunnel diode.

In FIG. 3 a different method of applying uniaxial stress to a tunnel diode junction 27 is illustrated. In FIG. 3 member 30 is a resilient metallic spring, the left end of spring 30 being firmly held by a rigid attachment to member 25, the latter being, as in FIG. 2, a member in which a measure of the instant strain is desired. A wafer of highly doped or degenerate semiconductive material 26 is mounted on the upper surface of spring 30, as by soldering. Lower lead 28 through spring 30 provides an ohmic contact to wafer 26. The tunnel diode junction 27 is formed on the upper surface of wafer 26 as in FIG. 2, by alloying small sphere 24 to wafer 26 and an electrical connection to the upper side or "outer" side of junction 27 is afforded by the upper lead 28 connecting to sphere 24.

A substantially identical tunnel diode comprising wafer 26, junction 27, and sphere 24 having connecting leads 28 can be similarly situated on the lower surface of spring 30, as shown, in which case a conventional bridge circuit with the tunnel diodes in adjacent arms of the bridge can be employed to enhance the indications obtained by "differential" action, in a manner well known and widely used by those skilled in the art.

One end of a rigid L-shaped member 32 is firmly attached, as by welding, to the right end of spring 30. The other end of member 32 is firmly attached to member 25 at an appreciable distance from the point of attachment of spring 30 to member 25 so that compressional strains established in member 25 will exert through member 32 an upwardly directed force on the right end of spring 30. Tensile strains in member 25 will similarly cause member 32 to exert a downwardly directed force on the right end of spring 30.

When spring 30 is flexed upwardly, wafer 26 on the upper surface of the spring 30 will be subjected to uniaxial compression in a direction substantially parallel to the plane of junction 27 and wafer 26' on the lower surface of spring 30 will be subjected to uniaxial tension substantially parallel to the plane of junction 27'. Obviously, if spring 30 is flexed downwardly, the converse stresses will be imposed on the respective diodes. As compared with the structure 23, 29 of FIG. 2, it is apparent that compression in the plane of the junction will have an effect similar to tension in the direction of the perpendicular to the junction and tension in the plane of the junction will have an effect similar to compression in the direction of the perpendicular to the junction. This should be borne in mind throughout the present application particularly in connection with the several characteristic curves to be described hereinunder wherein "tension" will normally be understood to mean that a tensile force is directed perpendicularly with respect to the junction under consideration and similarly "compression" will likewise normally be understood to mean that a compressive force is directed perpendicularly with respect to the junction. In general, uniaxial tension directed perpendicularly to the junction is to be understood as the equivalent of uniaxial compression directed in the plane of the junction and, similarly, uniaxial compression directed perpendicularly to the junction is to be understood as the equivalent of uniaxial tension directed in the plane of the junction.

In connection with the structures of FIGS. 2 and 3, it is obvious that instead of transmitting stresses resulting from strains in member 25, the stresses generated in a diaphragm by impingement of acoustic waves on the diaphragm could in similar manner be impressed upon the diode 24, 26, 27 through a mechanical link (not shown). The over-all arrangement would then function as a microphone or telephone transmitter. As will presently become apparent, however, the arrangements illustrated in FIGS. 4A and 4B are probably to be preferred for acoustic purposes as will be discussed in more detail hereinunder.

Figure 4A:
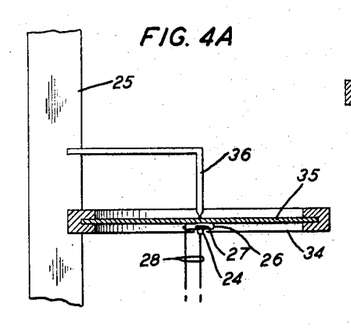
FIG. 4A illustrates a third manner of applying stress to a tunnel diode in which the stress is applied along a plurality of axes in a common plane, all axes being directed laterally to the junction of the tunnel diode.
Figure 4B:
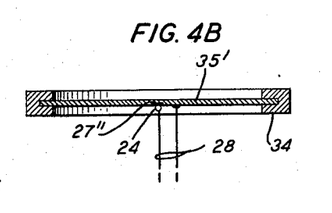
FIG. 4B illustrates an alternative arrangement of the general type illustrated in FIG. 4A.

The arrangement of FIG. 4A is similar to that of FIG. 3 except that the semiconductive wafer 26 is mounted centrally on the lower surface of a thin circular resilient diaphragm 35. The periphery of the diaphragm is firmly held by a rigid ring 34. Ring 34 is firmly attached to member 25 which is to be subjected to strain. A second rigid member 36, being substantially of L-shape, is firmly attached at one end to a point on member 25 at an appreciable distance from the point of attachment of ring 34 to member 25. The other end of member 36 is firmly attached to the center of the upper surface of diaphragm 35.

A tensile strain in member 25 will then cause the center point of diaphragm 35 to be displaced upwardly. This will obviously subject wafer 26 and its tunnel junction 27 to uniaxial compression in all radial directions in the plane of the junction. As noted above, this is the equivalent of subjecting the junction to tension perpendicularly directed to the junction.

Similarly, a compressive strain in 25 will cause the center point of diaphragm 35 to be displaced downwardly. This in turn will subject wafer 26 and its tunnel junction 27 to uniaxial tension in all radial directions in the plane of the junction 27 and, as noted above, the effect will be equivalent to subjecting the junction to compression perpendicularly directed to the junction.

Because of the fact that the junction 27 is, by the arrangement of FIG. 4A, uniaxially stressed in all radial directions in the plane of the junction, the effect on junction 27 is several times that of the single uniaxially directed stress of the same magnitude when impressed upon the junction by the simple longitudinal spring arrangement of FIG. 3 described in detail above.

In connection with the structure of FIG. 4A, it is obvious that if member 36 is omitted and compressional (that is, acoustic) wave energy is directed to strike diaphragm 35, the combination of diaphragm and tunnel diode will function as a telephone transmitter to convert the acoustic energy into a corresponding electrical signal.

In FIG. 4B, such an arrangement is indicated. Furthermore, in FIG. 4B the diaphragm 35' is of semiconductive material and the tunnel junction 27" is formed at its center so that when acoustic energy impinges on diaphragm 35' junction 27" will be stressed in all radial directions in the plane of the junction and an electric signal corresponding to the acoustic energy can be derived from the junction. This arrangement is obviously readily adapted for incorporation in an assembly of the type disclosed in the above-mentioned copending application of J. H. Forster and J. F. Grandner. The dimensions of the junction and the wafer can readily be made very small so that tunnel diode microphones of the present invention are uniquely suited for use in medical probing wherein an instrument with small attached wires is inserted through a vein into the heart to obtain measurements of pressure, et cetera. Where diaphragms of appreciable diameter are employed, consideration should be given to employing a concentrically positioned junction of circular shape as will be described hereinunder in connection with FIG. 8.

Figure 5:
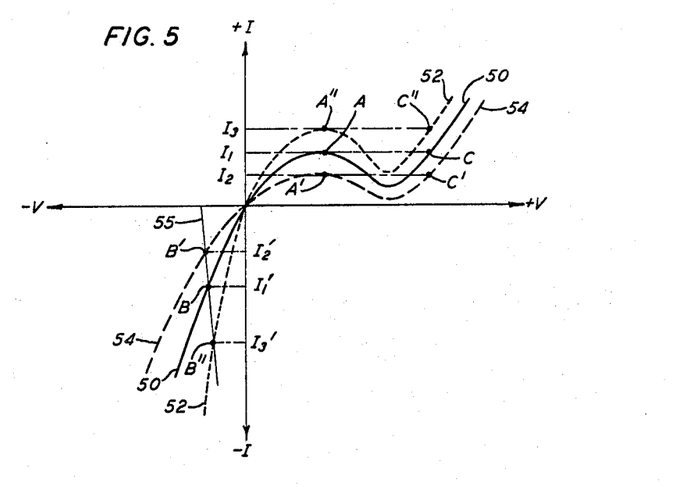
FIG. 5 illustrates curves of the characteristics obtained from a representative tunnel diode for differing uniaxial stresses.

In FIG. 5 solid line curve 50 is representative of the current-voltage characteristic of a representative tunnel diode under atmospheric pressure only, horizontal axis $-V$ to $+V$ representing the voltage impressed on the diode, positive (forward) values lying to the right of the vertical or current axis $-I$ to $+I$ and negative (backward) values lying to the left of the current axis, as indicated.

As understood by those skilled in the art, a tunnel diode employing an n-type wafer, has a positive or forward bias if the ohmic connection to the wafer is connected to the negative terminal of the source of bias voltage and a negative or backward bias if the ohmic connection to the wafer is connected to the positive terminal of the source of bias voltage or vice versa for a diode employing a p-type wafer. Similarly, positive (forward) current values are represented above the horizontal or voltage axis and negative (backward) current values are represented below the voltage axis.

It should be particularly noted that the tunnel diode is not a rectifier, that is, it is not nonconducting at negative or backward bias voltages as contrasted with semiconductor diodes having the conventional nontunneling thicker p-n junctions of the prior art.

If subjected either to a substantial uniaxial compressive force, normal to the junction as can be applied by the means indicated in FIG. 2, or to a substantial uniaxial tensile force directed parallel to the junction as can be applied by the arrangements of FIGS. 3, 4A and 4B, an altered characteristic such as that indicated by the dash-line curve 54 of FIG. 5 will be obtained with particular tunnel diodes, as for example, those formed on wafers of n-type germanium, p-type gallium arsenide or p-type and n-type gallium antimonide. Similarly, if subjected to tension by the application of a perpendicular force as in the arrangement of FIG. 2 or uniaxial compression parallel to the junction as in FIGS. 3, 4A and 4B, a differently altered characteristic such as that indicated by the dotted line curve 52 of FIG. 5 will be obtained with the same diodes.

Similar changes but of opposite directions for compressive and tensile stress, respectively, will be obtained for certain other tunnel diodes, as for example, those formed on wafers of n-type silicon. By "opposite" directions, it is meant that for a uniaxial perpendicularly directed compressive stress a change in characterisitc response of the type illustrated by curve 52 will take place and for a uniaxial perpendicularly directed tensile stress the change will be of the type illustrated by curve 54.

As illustrated by the curves of FIG. 5, which will be assumed, for purposes of illustration, to apply to tunnel diodes of p-type gallium antimonide, when subjected to a uniaxial perpendicular compressive stress the current values will decrease for both forward (positive) and backward (negative) bias voltages. Conversely, when subjected to a uniaxial perpendicular tensile stress the current values will increase for both forward and backward bias voltages.

In accordance with conventional practice in the art, if tunnel diodes are employed as strain gauges, that is, to indicate compressive and/or tensile stresses the diode is usually biased to operate at or near the crest of the first positively directed (rising) portion of its characteristic with positive or forward bias, as for example at point A of curve 50 corresponding to current $I_1$. Then the application of a uniaxial perpendicular compressive stress on the diode would result in a change to a point such as A' on curve 54 corresponding to a current of $I_2$ and the application of a perpendicularly directed uniaxial tensile stress would result in a change to a point such as A'' on curve 52 corresponding to a current of $I_3$.

Operation in this manner, however, involves either the provision of adequate stabilizing means or the assumption of the hazard that noise currents could cause the diode to switch through its negative resistance region to its second forward or positive region, that is, the diode may readily switch from point A to point C, or from point A' to point C', or from point A'' to point C'', and its operation would then be unstable and it would not be possible to obtain reliable indications of the response of the diode to the stress.

On the other hand, if the diode is biased in the backward (negative) direction, as for example at a point such as B on curve 50 corresponding to a reverse or negatively directed current $I_1'$, then uniaxial perpendicularly directed compressive stress would shift the diode to point B' and decrease the current to $I_2'$ and a similarly directed tensile stress would shift the diode to point B'' and increase the current to $I_3'$. The hazard of the diode switching would then obviously be eliminated and the provision of stabilizing means would be unnecessary. The "voltage bias line" 55 inclines to the right with increasing current, as shown, since, referring to the circuit diagram of FIG. 1, the voltage drop in resistor 16 obviously increases as the current increases, thus reducing the effective voltage across the diode junction.

From the assumption made above in connection with FIG. 5, that is, that a perpendicularly directed uniaxial compressive stress causes a decrease in the peak current from point A to point A', the tunnel diodes represented must, as previously stated, be of a kind and of a material, that is, of a class, for which the peak current decreases with pressure. As mentioned hereinabove, this class includes germanium (n-type wafer), gallium arsenide (p-type wafer) and gallium antimonide (p-type and n-type wafers).

Curves similar to those shown in FIG. 5 will be obtained for the class of tunnel diodes for which the peak current increases with a uniaxial perpendicularly directed compressive stress, but for this class of materials curve 52 would be representative of the characteristic of the tunnel diode under compression and curve 54 would be representative of the characteristic of the tunnel diode under tension. A member of this class mentioned above is the silicon tunnel diode (n-type wafer).

The magnitude of the change in peak current would of course vary with the sensitivity of the specific tunnel diode being used. The relative sensitivities of several representative tunnel diodes to hydrostatic pressure have been set forth hereinabove. In general, as previously mentioned, their respective sensitivities to uniaxial stresses will be comparable in order of magnitude to those for hydrostatic pressures.

Figure 6:
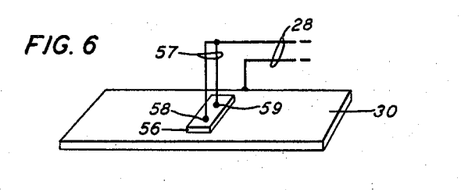
FIG. 6 illustrates a convenient way of employing more than one tunnel diode in an arrangement of the invention.

In FIG. 6 the use of two tunnel diodes connected in parallel for obtaining an enhanced response to stress is illustrated. It is intended for use in an arrangement similar to that of FIG. 3 as described hereinabove, except that a single wafer 56 mounted on spring 30 of FIG. 6 has induced thereon two substantially identical tunnel diode junctions 58 and 59. These junctions are formed side by side and symmetrically located on the transverse (front to rear) center line of the upper surface of wafer 56, as shown.

The two tunnel diode junction leads 57 are connected in parallel to upper lead 28 as shown. The two diode junction arrangement of FIG. 6 can obviously be substituted for the single diode arrangement of FIG. 3.

The two diode junctions 58 and 59 of FIG. 6 are placed in the symmetrical arrangement shown in order that the stress imposed on each may be substantially the same as that imposed on the other. As for FIG. 3, so in FIG. 6 the application of a force flexing spring 30 downwardly subjects the two diode junctions to a uniaxial transversely directed tensile stress and the application of a force flexing spring 30 upwardly subjects them to a uniaxial transversely directed compressive stress.

Figure 9:
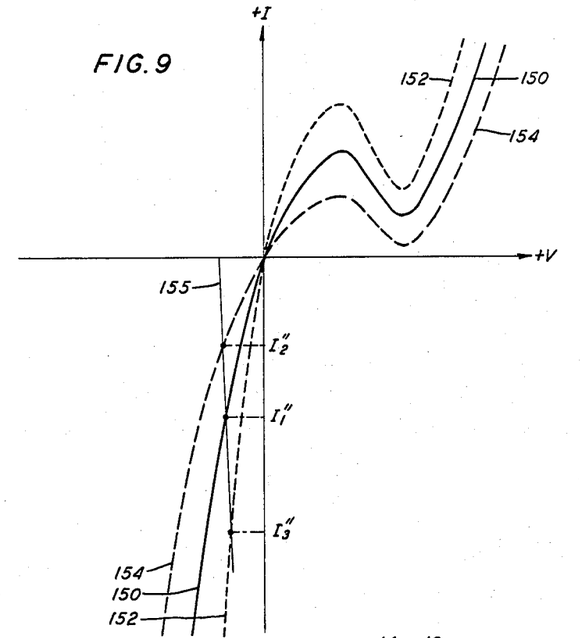
FIG. 9 illustrates the combined characteristics of two tunnel diodes electrically connected in parallel and subjected to specific stresses.

The characteristics of the two tunnel diode junctions connected in parallel, as shown in FIG. 6, are in effect the sum of their respective individual characteristics. Assuming each to have substantially the characteristics illustrated in FIG. 5, their combined characteristics will be substantially as illustrated in FIG. 9, solid line curve 150 iustrating their combined characteristics with no stress on spring 30, dotted line curve 152 corresponding to a specific transverse tensile stress and dash-line curve 154 corresponding to a specific transverse compressive stress, each diode junction being assumed to be subjected to the same stress as for a single diode junction in connection with FIG. 5. As is apparent from FIGS. 9 and 5, with a back bias voltage, represented by line 155 of FIG. 9 comparable to the bias line 55 of FIG. 5, the differences between the values of current $I_1''$, $I_2''$ and $I_3''$ are approximately double the corresponding differences between the corresponding currents for a single junction as illustrated by FIG. 5.

Obviously, any convenient number of additional, substantially identical tunnel diode junctions may be formed on wafer 42, located so as to be subjected to substantially equal stresses, and the combined characteristics of all the diodes connected in parallel will produce current amplitude value differences increased by a factor, representing the number of junctions, times the current amplitude value differences obtained with a single junction.

Obviously, also, each tunnel diode or other group of tunnel diodes, if a large number are employed, may be formed on a wafer separate from that of others and the diodes may subsequently be electrically connected in parallel. The economy of forming as many diode junctions on a single wafer as practicable is, of course, obvious.

In the ultimate for a single wafer, a continuous, very thin line junction can be formed as will next be described in connection with FIGS. 7 and 8.

Figure 7:
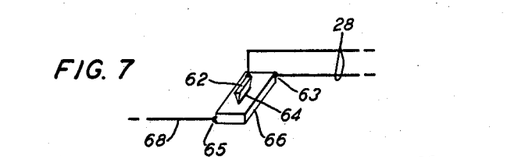
FIG. 7 illustrates a first convenient arrangement multiplying the effectiveness of a tunnel diode.
Figure 8:
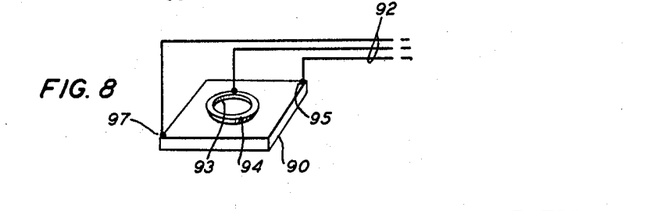
FIG. 8 illustrates a second convenient arrangement multiplying the effectiveness of a tunnel diode.

In FIGS. 7 and 8 further arrangements of the invention for enhancing the sensitivity of tunnel diode junctions to stress are illustrated.

In FIG. 7 a wafer of semiconductive material 66 has a tunnel diode junction 64 formed on its surface. Junction 64 is a continuous straight line having a width substantially equal to the diameter of the single spot tunnel diodes heretofore employed, that is, from three-tenths mil inch to two mil inches. It can be formed for example by alloying the very thin knife edge of a member 62 to a wafer of degenerate semiconductive material in substantially the same way that the small sphere is employed in making the small spot junction. Alternatively, a very thin line of appropriately chosen metal can be vapor deposited on the wafer through a suitable mask and alloyed to the wafer by heating, after which a knife edge member can be assembled to make contact with the alloy strip. As a further alternative, a mesa construction can be employed to raise the line junction and a fine conductive lead may then be soldered to the line junction to provide a connection to its "outer" surface.

As a further feature of the device of FIG. 7 which is, incidentally, equally applicable to the conventional single spot tunnel diode, two independent ohmic contacts 63 and 65 spaced from each other and from junction 64 are also made to wafer 66. One ohmic contact 63, for example, can be associated with junction 64 and connected through leads 28 to a circuit substantially identical with the circuit of FIG. 1. The purpose and effects obtainable by use of the second ohmic contact 65 will be explained hereinafter in connection with the arrangement of FIG. 10.

The voltage of source in the circuit of FIG. 1 can, for example, then be varied over a range of voltages to obtain a characteristic similar to characteristic 50 of FIG. 5 except that the relative amplitudes of all points on the curve for the line junction tunnel diode of FIG. 7 will be multiplied by a factor determined by the number of spot junction tunnel diodes to which the line junction is equivalent. This assumes the absence of stress on the junction and that electrical lead 68 to the second ohmic contact is not connected to any circuit.

In FIG. 8 a device related to and resembling in many aspects that of FIG. 7 is illustrated. It comprises a wafer 90 of degenerate semiconductive material, a thin line ring or circular tunnel junction 93 formed on the upper surface of wafer 90, a circular knife-edged member 94 making contact with the "outer" side of junction 93 and three electrical leads 92. The upper and lower leads 92 connect to two ohmic contacts 97 and 95, respectively, as shown, and the center lead 92 connects to member 94. Obviously, the device of FIG. 8 is similar to that of FIG. 7 except that the line junction 93 forms a closed circle or ring instead of being a straight line as for junction 64 of FIG. 7. The device of FIG. 8 is suggested for mounting centrally on diaphragm 35 of FIG. 4A in place of wafer 26 and its single spot junction 27. The arrangement of FIG. 4B obviously also can be modified to have a thin line ring junction centrally located on diaphragm 35'. All points of the ring junction 93 when centrally mounted on a diaphragm would then, obviously, be subjected to equal radial pressures or tensions when the diaphragm was flexed.

Figure 10:
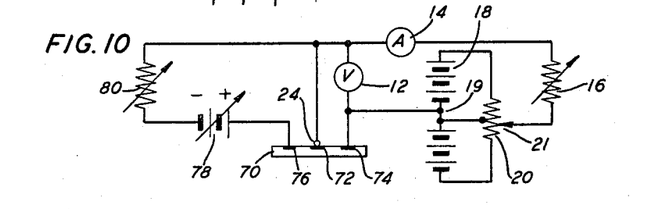
FIG. 10 illustrates, in one schematic form, the use of an additional bias on a tunnel diode.

Turning next to FIG. 10, wafer 70 of degenerate semiconductive material has a spot type tunnel junction 72 and two ohmic contacts 74 and 76 on its upper surface. The ohmic contacts are spaced from junction 72 and from each other. As shown, one ohmic contact 74 and the junction 72 can be connected in a circuit identical with that of FIG. 1 as described in detail above and with the other ohmic contact 76 disconnected from the circuit, the characteristic of the tunnel diode of FIG. 10 could be, for example, identical with that of the tunnel diodes of FIGS. 2 and 3 as illustrated by curve 50 of FIG. 5. This characteristic has been reproduced and extended as curve 170 of FIG. 12.

Figure 12:
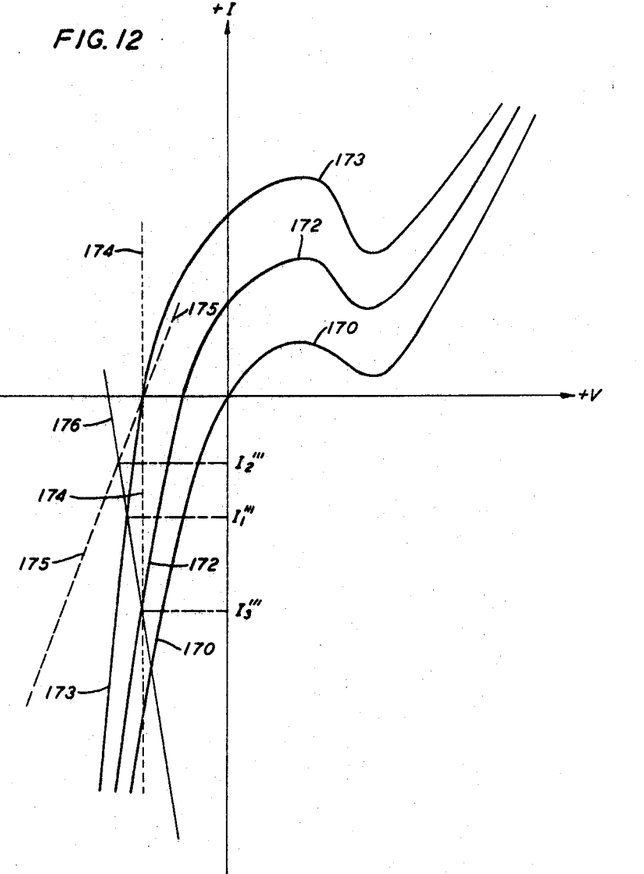
FIG. 12 illustrates characteristics obtainable by tunnel diodes having various additional biases as indicated in FIGS. 10 and 11.

Now, if a second voltage biasing circuit, consisting of a variable voltage source 78 and variable resistor 80 connected in series as shown, is connected between the tunnel junction 72 and the second ohmic contact 76, a plurality of characteristics may be obtained for a like plurality of voltages as determined by adjustments of source 78 and/or of the settings of variable resistor 80. Representative characteristics are shown in FIG. 12, curve 170 representing, as above stated, the characteristic with the circuit comprising source 78 and resistor 80 omitted. Curves 172 and 173 represent characteristics obtained when the effective voltage of the circuit including source 78 and resistor 80 is adjusted to each of two respective fixed values representing respectively negative biases, the second being greater than the first.

The effect, as is obvious from inspection of FIG. 12, is to shift the whole characteristic upwardly and to extend the negative voltage portion to the left. It should be particularly noted that in the region of backward (negative) bias, and backward (negative) current, the slope of the curve more nearly approaches the vertical as the negative bias on ohmic contact 76 is increased.

Accordingly, if operated, for example, with the bias on the second ohmic contact circuit for which the tunnel diode has the characteristic 173, much greater changes with applied stress in the current $I_1'''$ for a negative bias represented by line 176 will be obtained. Under a specific compressive stress the characteristic 173 will shift to dash-line characteristic 175 and under a specific tensile stress the characteristic 173 will shift to dotted line characteristic 174. Similarly, the current $I_1'''$ will shift to value $I_2'''$ under the specific compressive stress and to value $I_3'''$ under the specific tensile stress.

In the arrangement of FIG. 10 the stresses may be applied either perpendicularly or laterally to the tunnel diode junction 72, as, for example, by the arrangements of FIGS. 2, 3, 4A and 4B, described in detail hereinabove.

Figure 11:
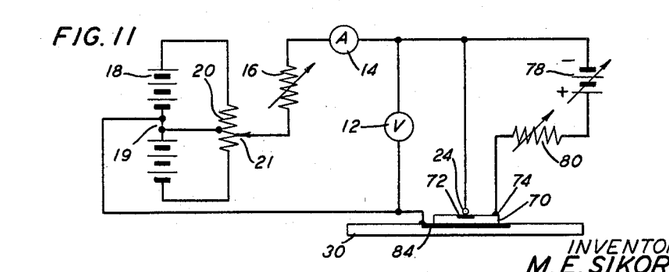
FIG. 11 illustrates in a second schematic form the use of an additional bias on a tunnel diode.

In the combination of FIG. 11, circuit arrangements identical to those described above in connection with FIG. 10 are shown. The structure of FIG. 11 differs from that of FIG. 10, however, in that the wafer 70 is mounted directly on the conductive spring 30 which serves both as one ohmic contact to wafer 70 and as a means for converting force resulting from flexure of spring 30 (see description of FIG. 3) to a laterally directed tensile or compressive stress on junction 72.

While the ohmic contacts 74 and 76 are shown in FIG. 10 as on opposite sides of the tunnel junction 72, radically differing other arrangements such as that shown in FIG. 11 and the like are equally effective. Particular arrangements affording optimum operating characteristics for various specific purposes respectively can be readily devised by those skilled in the art.

Figure 13:
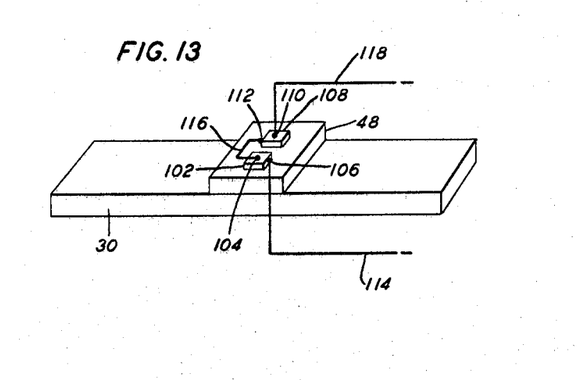
FIG. 13 illustrates a second manner of employing more than one tunnel diode in an arrangement of the invention.

In FIG. 13 two tunnel diodes are illustrated connected electrically in series by lead 116, as shown. The near side diode comprises wafer 102, tunnel junction 104 and ohmic connection 106. The far side diode comprises wafer 108, tunnel junction 110 and ohmic connection 112. The two diodes are assembled on a common transverse axis of spring 30 so as to be subjected to like uniaxial transverse compression or tension when spring 30 is flexed as suggested, for example, in connection with FIG. 3 as described in detail hereinabove. In this case, member 48 is, of course, of nonconductive material such as a highly adhesive, nonconductive cement so that wafers 102 and 108 are electrically insulated from each other and from spring 30. Lead 114 is then connected to ohmic connection 106 of wafer 102, lead 116 interconnects tunnel junction 104 of wafer 102 to the ohmic connection 112 of wafer 108 and lead 118 connects to the tunnel junction 110 of wafer 108. The two tunnel diodes are thus connected electrically in series and leads 114, 118 may be employed to connect the combination into a circuit such as that of FIG. 1.

Figure 14:
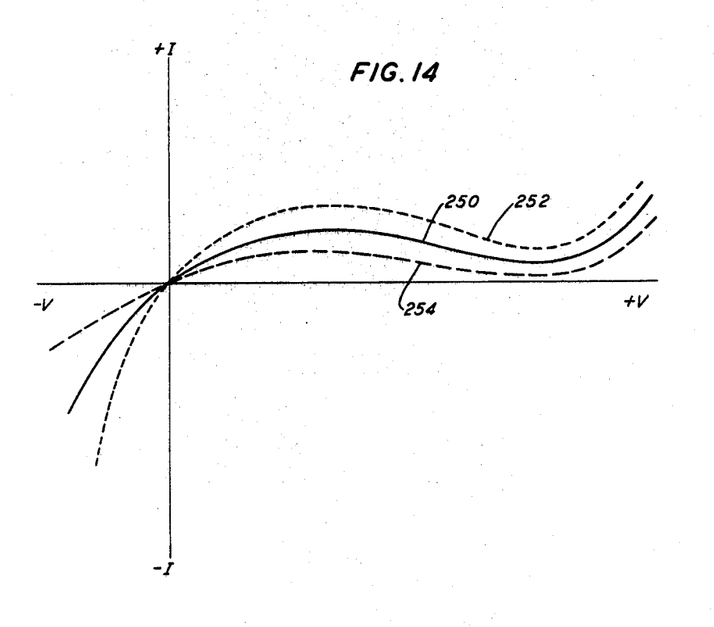
FIG. 14 illustrates the combined characteristics of two tunnel diodes connected electrically in series and subjected to specific stresses.

In FIG. 14 the combined current-voltage characteristics of the two tunnel diodes of FIG. 13 are illustrated, assuming that each diode has a set of characteristics substantially as illustrated in FIG. 5 and described in detail hereinabove. Solid line curve 250 is then the characteristic of the combination of the two diodes in series with no tensile or compressive stress applied to either diode. Dotted line curve 252 is the characteristic of the combination of two diodes in series when both are subjected to a specific uniaxial tensile stress by flexing of spring 30 in one direction and dash-line curve 254 is the characteristic when the two diodes in series are both subjected to a specific uniaxial compressive stress by flexing spring 30 in the other direction. Obviously, the effect of placing the two diodes electrically in series is to "flatten" the characteristic vertically and extend it horizontally so that the negative resistance portion of the characteristic is extended horizontally and its effective slope is decreased. The effect is, of course, proportional to the number of tunnel diodes connected in series so that substantially any desired degree of "flatness" of the characteristic (vertically) can readily be obtained by employing an appropriate number of diodes connected electrically in series. Furthermore, by employing additional stabilization, as, for example, by use of shunting resistors as taught in my above-mentioned Patent 3,184,972, issued May 25, 1965, any desired degree of stabilization can be obtained so that a very small change in current will produce a very large change in voltage for a plurality of diodes connected electrically in series and appropriately biased in the forward direction. Obviously, combinations of groups of tunnel diodes, the groups being electrically in series or in parallel, the diodes in each group being in parallel or in series, respectively, can be readily devised to combine the advantages of the arrangements of FIGS. 6, 7, 8, and 13. Many uses for such arrangements will immediately occur to those skilled in the art.

Numerous and varied modifications and rearrangements of the features of the illustrative embodiments described in detail above obviously can be readily devised by those skilled in the art without departing from the spirit and scope of the principles of the invention.

What is claimed is:

1. In combination: a wafer of degenerate semiconductive material; a tunnel p-n junction formed on the surface of said wafer; means for applying a backward direct current bias across said junction; means responsive to a varying ambient condition for impressing a perpendicularly-directed uniaxial stress upon said junction; and means for utilizing the resulting current modulation through said junction.

2. The combination claimed in claim 1, wherein said junction is formed as a closed circular loop.

3. The combination claimed in claim 2, wherein said utilization means comprises an electro acoustic transducer.

4. The combination claimed in claim 2 wherein said utilization means comprises an ammeter calibrated in units of strain measurement.

References Cited

UNITED STATES PATENTS

| | | | |
|---|---|---|---|
| 2,771,382 | 11/1956 | Fuller | 317—235 |
| 3,107,277 | 10/1963 | Rogers. | |

OTHER REFERENCES

Rogers: Journal Acoustical Society America, vol. 34, No. 7, July 1962, pp. 883–893.

Sikorski et al.: Review Scientific Instruments, vol. 33, No. 2, February 1962, pp. 155–160.

RICHARD C. QUEISSER, *Primary Examiner.*

C. A. RUEHL, *Assistant Examiner.*